(12) United States Patent
Kosa et al.

(10) Patent No.: US 8,562,130 B2
(45) Date of Patent: *Oct. 22, 2013

(54) INTERCONNECTION TAB USED WITH OPTICAL DEVICES

(75) Inventors: Tamas Kosa, Hudson, OH (US); Roy Miller, Stow, OH (US); Christine Martincic, Cuyahoga Falls, OH (US); Eui-Yeul Park, Hudson, OH (US); Bahman Taheri, Shaker Heights, OH (US)

(73) Assignee: Alphamicron Incorporated, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,652

(22) Filed: May 2, 2011

(65) Prior Publication Data
US 2011/0211157 A1 Sep. 1, 2011

Related U.S. Application Data

(63) Continuation-in-part of application No. 12/438,849, filed as application No. PCT/US2007/019633 on Sep. 10, 2007, now Pat. No. 7,936,496.

(60) Provisional application No. 60/843,599, filed on Sep. 11, 2006, provisional application No. 60/919,416, filed on Mar. 22, 2007.

(51) Int. Cl.
*G02C 7/02* (2006.01)

(52) U.S. Cl.
USPC .................................................. 351/159.01

(58) Field of Classification Search
USPC ........ 349/1, 16, 113, 114; 359/237, 245, 601, 359/838; 351/159.01
See application file for complete search history.

(56) References Cited

U.S. PATENT DOCUMENTS

| 4,386,293 | A | 5/1983 | Waldron .................... 313/583 |
| 5,067,796 | A | 11/1991 | Suzuki et al. ................ 359/88 |

(Continued)

FOREIGN PATENT DOCUMENTS

| JP | 59 094780 | 5/1984 |
| WO | WO 94/00789 | 1/1994 |
| WO | WO 00/77559 A1 | 12/2000 |

OTHER PUBLICATIONS

International Search Report mailed Feb. 6, 2008 in priority application PCT/US2007/019633.
Written Opinion mailed Feb. 6, 2008 in priority application PCT/US2007/019633.

(Continued)

*Primary Examiner* — Alessandro Amari
*Assistant Examiner* — Jie Lei
(74) *Attorney, Agent, or Firm* — Renner Kenner Greive Bobak Taylor & Weber

(57) ABSTRACT

An optical device with at least one interconnection tab is provided. The optical device includes a pair of opposed substrates with a gap therebetween filled with an electro-optic material. Each substrate has a facing surface with a substrate electrode disposed thereon. A sealing material is disposed between the pair of opposed substrates to contain the electro-optic material. At least one interconnection tab is interposed between the substrates. The interconnection tab includes an insulator layer with opposed surfaces. A tab electrode is provided on each surface, wherein each tab electrode is in electrical connection with a corresponding substrate electrode facing the tab electrode. And a pad electrode is also provided on each surface, wherein each pad electrode is in electronic connection with the substrate electrode facing the opposed surface of the insulator layer.

15 Claims, 7 Drawing Sheets

(56) References Cited

U.S. PATENT DOCUMENTS

| | | | |
|---|---|---|---|
| 5,416,622 A | 5/1995 | Engfer et al. | 359/88 |
| 6,213,602 B1 | 4/2001 | Smarto | 351/159 |
| 6,847,428 B1 | 1/2005 | Sekiguchi et al. | 349/139 |
| 7,425,066 B2 | 9/2008 | Blum et al. | 351/159 |
| 7,576,362 B2 | 8/2009 | Takayama et al. | 257/79 |
| 7,936,496 B2 * | 5/2011 | Kosa et al. | 359/245 |
| 2005/0057701 A1 * | 3/2005 | Weiss | 349/10 |

OTHER PUBLICATIONS

Office Action mailed Jul. 1, 2010 in corresponding U.S. Appl. No. 12/438,849.

Response to Office Action mailed Jul. 1, 2010 filed Oct. 29, 2010 in corresponding U.S. Appl. No. 12/438,849.

Notice of Allowance mailed Jan. 5, 2011 in corresponding U.S. Appl. No. 12/438,849.

* cited by examiner

INTERCONNECTION TAB USED WITH OPTICAL DEVICES

CROSS-REFERENCE TO RELATED APPLICATIONS

This application is a continuation-in-part application of U.S. application Ser. No. 12/438,849 filed Feb. 25, 2009, issued as U.S. Pat. No. 7,936,496 on May 3, 2011 and which claims benefit of PCT application PCT/US2007/019633 filed Sep. 10, 2007 which claims benefit of U.S. Provisional Application Ser. Nos. 60/843,599 filed Sep. 11, 2006 and 60/919,416 filed Mar. 22, 2007, all of which are incorporated herein by reference.

TECHNICAL FIELD

The present invention is generally directed to optical devices. In particular, the present invention is directed to optical devices using electronically controllable variable optical properties such as those available with liquid crystal materials. Specifically, the present invention is directed to such devices having a flexible interconnection tab.

BACKGROUND ART

Electro-optical materials, which change their optical appearance upon application of an electrical field, have been developed for use with different optical devices, including eyewear, protective goggles, visors, automotive mirrors, windows, etc. Liquid crystal materials are commonly used but other electro-optic materials show promise.

In the case of eyewear, such as goggles and visors, it will be appreciated that a number of problems are realized in attempting to incorporate a liquid crystal device into a prior art eyewear frame. Indeed, given the basic form and construction of a liquid crystal device or any device which uses an electro-optic material that can be used in a lens, special features must be incorporated into an eyeglass frame to accommodate such a lens. As will be understood by a skilled artisan, liquid crystal and other electro-optic lenses have an edge seal wherein a glue or adhesive bead with different electro-optical properties than the active area—the area containing the electro-optic material—is provided. It will be appreciated that it is desirable to hide the edge seal within the eyewear frame. Moreover, these types of lenses require protruding tabs to serve as electrodes for allowing application of a desired electrical waveform or voltage to the electro-optic material. Accordingly, the device, the edge seal, and/or the electrode tabs are typically not robust enough to survive insertion into an elastically deformed frame. This is especially true in sunglasses which do not employ a carrier lens. In other words, in generally ophthalmic eyewear applications, a corrective lens is provided which provides a substantial carrier or base to which the liquid crystal device may be attached. As such, the rigidity of the carrier is able to withstand the forces required to insert the lens into the eyewear. However, a liquid crystal lens or similar lens, by itself, cannot withstand such forces. It will further be appreciated that the electro-optic lenses require batteries, drive circuits, switches and other interconnecting conductors for operation. These components must be located somewhere in or on the frame while maintaining an aesthetically pleasing appearance or indeed, be totally unobservable by the wearer or the casual observer. Similar issues may be encountered when attempting to incorporate an electro-optically active material within an optical device such as an automotive mirror, etc.

One aspect of liquid crystal cells that have proven to be problematic is the interface of the liquid crystal (LC) cell electrodes which are used to apply an electric field to the liquid crystal material. Past LC cells required each electrode to be patterned with a special tab to which some type of conductor, e.g. wire or tape, was used for interconnection to a control circuit. Although such an approach was workable, it has been found to be difficult to implement for manufacturing a large number of cells in devices such as eyewear, scopes or mirrors. And such an interconnection was found to be somewhat unreliable and susceptible to breakage. Moreover, the need to form a tab hinders the ability to extend the electro-optically active material to peripheral edges of the cells. Additionally, some cell designs have used small amounts of conductive materials (adhesives) as so-called "crossover dots" to electrically connect the electrode of one substrate to a separate conductive tab on the opposing substrate. As such, crossover dots further complicate cell design and provide another point for device failure. A further drawback of cell designs employing crossover dots is that if the cell is found to be defective, it cannot be easily repaired because it cannot be easily disconnected from the electronic control circuit.

Based upon the foregoing problems, it will be appreciated that there is a need for an improved interconnection of electro-optic cells within optical devices. Indeed, there is a need for optical cell interconnections that do not require special patterning of the electrode layers on the cells. And there is a need for an interconnection that is flexible and robust.

BRIEF DESCRIPTION OF THE DRAWINGS

For a complete understanding of the objects, techniques and structure of the invention, reference should be made to the following detailed description and accompanying drawings wherein.

SUMMARY OF THE INVENTION

Figure 1A:
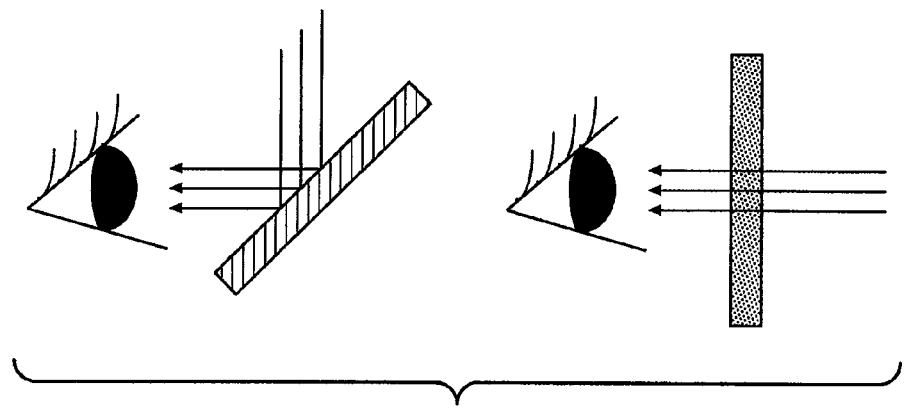
FIG. 1A is a schematic drawing of two examples of optical devices wherein a light reaching the eye has to either pass through or be reflected off of the device.

In light of the foregoing, it is a first aspect of the present invention to provide an interconnection tab used with optical devices.

It is another aspect of the present invention to provide an optical device having at least one interconnection tab comprising a pair of opposed substrates having a gap therebetween filled with an electro-optic material, each substrate having a facing surface with a substrate electrode disposed thereon, a sealing material disposed between the pair of opposed substrates to contain the electro-optic material, and at least one interconnection tab interposed between the substrates. The interconnection tab comprises: an insulator layer having opposed surfaces, and each insulator surface comprises a tab electrode in electrical connection with the substrate electrode facing the tab electrode, and a pad electrode in electrical connection with the substrate electrode facing the opposed surface of the insulator layer.

In some embodiments, the insulator layer of the optical device is configured so that each tab electrode, and each pad electrode has at least one conductive via extending therethrough so that each pad electrode is in electrical connection to the tab electrode on the opposed surface of the insulator layer.

In some embodiments, the optical device further comprises a conductive adhesive disposed on at least a portion of each tab electrode.

In some embodiments, the insulator layer of the optical device has a cell edge received between the pair of opposed substrates opposite a terminal edge extending from the substrates.

In some embodiments, the tab electrode is L-shaped.

In some embodiments, each pad electrode is spaced apart from the tab electrode on each surface of the insulator layer.

In some embodiments, the interconnection tab has a thickness that is greater than the gap between the pair of opposed substrates.

In some embodiments, the interconnection tab is flexible.

In some embodiments, the interconnection tab is removably insertable between the pair of opposed substrates.

Also provided herein is an optical device, comprising: a first and second flexible substrate having a gap therebetween filled with an electro-optic material and a sealing material disposed therebetween to contain the electro-optic material, the first substrate having a first substrate electrode and the second substrate having a second substrate electrode; and an interconnection tab interposed between the first and second substrates. The interconnection tab includes: an insulator layer having a top surface opposite a bottom surface; configured so that disposed on its top surface is a first tab electrode and a first pad electrode; and disposed on its bottom surface is a second tab electrode and a second pad electrode; wherein the first tab electrode and the second pad electrode are in electrical connection with the first substrate electrode, and wherein the second tab electrode and the first pad electrode are in electrical connection with the second substrate electrode.

In some embodiments, the first tab electrode and the first pad electrode on the top surface are spaced apart from each other, and the second tab electrode and the second pad electrode on the bottom surface are also spaced apart from each other.

BEST MODE FOR CARRYING OUT THE INVENTION

The structures shown schematically in the drawings have parts that are examples of the elements recited in the claims. The illustrated structures thus include examples of how a person of ordinary skill in the art can make and use the claimed invention. It is described here to meet the enablement and best mode requirements of the patent statue without imposing limitations that are not recited in the claims.

The present application contemplates an optical device containing an interconnection tab. As used herein, optical devices are electro-optic based devices wherein the transmission or reflection of the light is altered through applying a voltage to an electro-optic material such as a liquid crystal, electrochromic, electro-phoretic, or a like material. In such optical devices, the light reaches the eye after it has passed through the device, or after it has reflected off of the device. (See FIG. 1A) Optical devices include but are not limited to eyewear (including glasses, safety glasses, sun glasses, sports glasses, visors, motorcycle visors, goggles, ski goggles, or the like), electro-optically variable mirrors including automotive mirrors, architectural window panels, glass including automotive window glass, avionic window shades, scopes (telescopic sights) such as a gun or rifle scope, displays and the like.

Figure 1B:
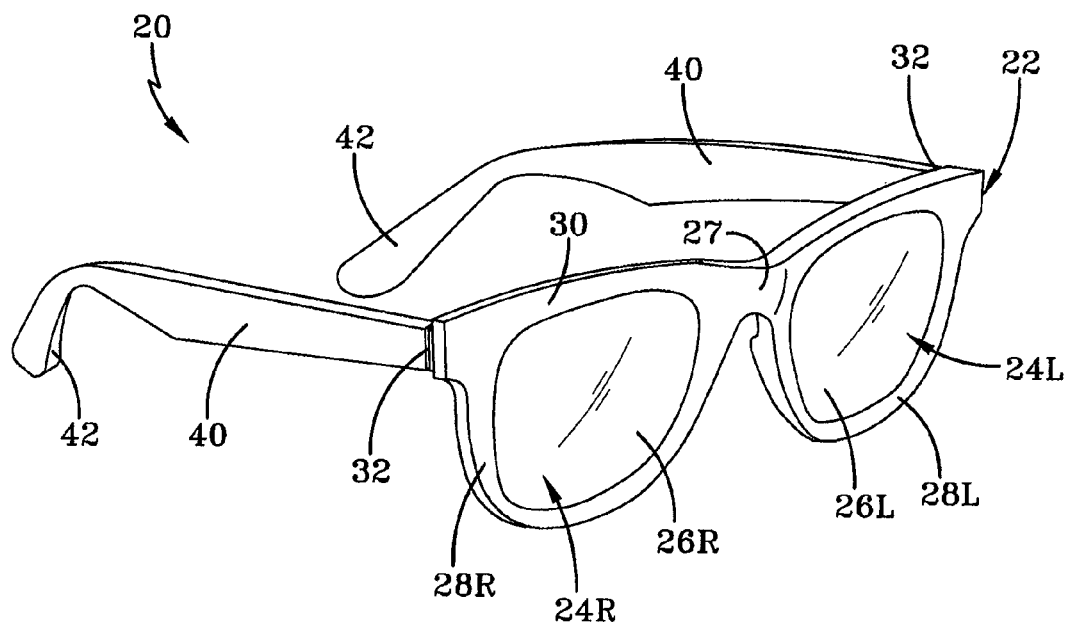
FIG. 1B is a perspective view of a prior art eyewear assembly.

One example of an optical device, an eyewear device, is described in further detail below. Referring to the drawings, and in particular to FIG. 1B, it can be seen that a prior art eyewear assembly is designated generally by the numeral 20. It will further be appreciated that the eyewear assembly may also be referred to as glasses, spectacles, or the like. The eyewear assembly includes a frame 22 which provides at least one aperture 24 which carries a cell (lens) 26 which may also be referred to as an optical device.

In most eyewear, it will be appreciated that two apertures are provided wherein each aperture is associated with the wearer's eye. Accordingly, the apertures, lenses and other related components associated with the wearer's left eye are provided with a capital letter L suffix and the aperture, lens and other components associated with the wearer's right eye are provided with a capital letter R suffix. The frame 22 may include a bridge 27 which separates a rim 28L from a rim 28R. And the frame may be provided in either a rimmed, semi-rimless or rimless configuration. The frame 22 provides a frame front 30 upon which may be mounted a hinge 32. Although not shown in detail, it will be appreciated that the hinge 32 may provide a frame finger that is secured to the frame front wherein a temple finger, which is secured to a temple 40, mates with the frame finger and is interconnected thereto by a pin. Although not shown, the hinge may be provided in a spring-biased or other configuration. As noted, the temple 40 extends from the temple finger or from the frame front and is aligned to be adjacent the head of the wearer in such a manner that the eyewear is easily carried by the user's head. If desired, an earpiece 42 may extend from each temple 40 so as to facilitate retention of the eyewear assembly upon the wearer's head. In typical eyeglass or eyewear configurations, a lens is carried within the aperture 24 to provide vision correction in any number of configurations. In other words, the lenses may be configured to improve near-sightedness, far-sightedness and other eye-related impairments. And lenses may be shaded or tinted to provide protection from sun glare, ultraviolet light and the like. It will also be appreciated that tinted eyewear may be utilized as a fashion accessory to match physical attributes or clothing of the person wearing the eyewear.

Figure 2:
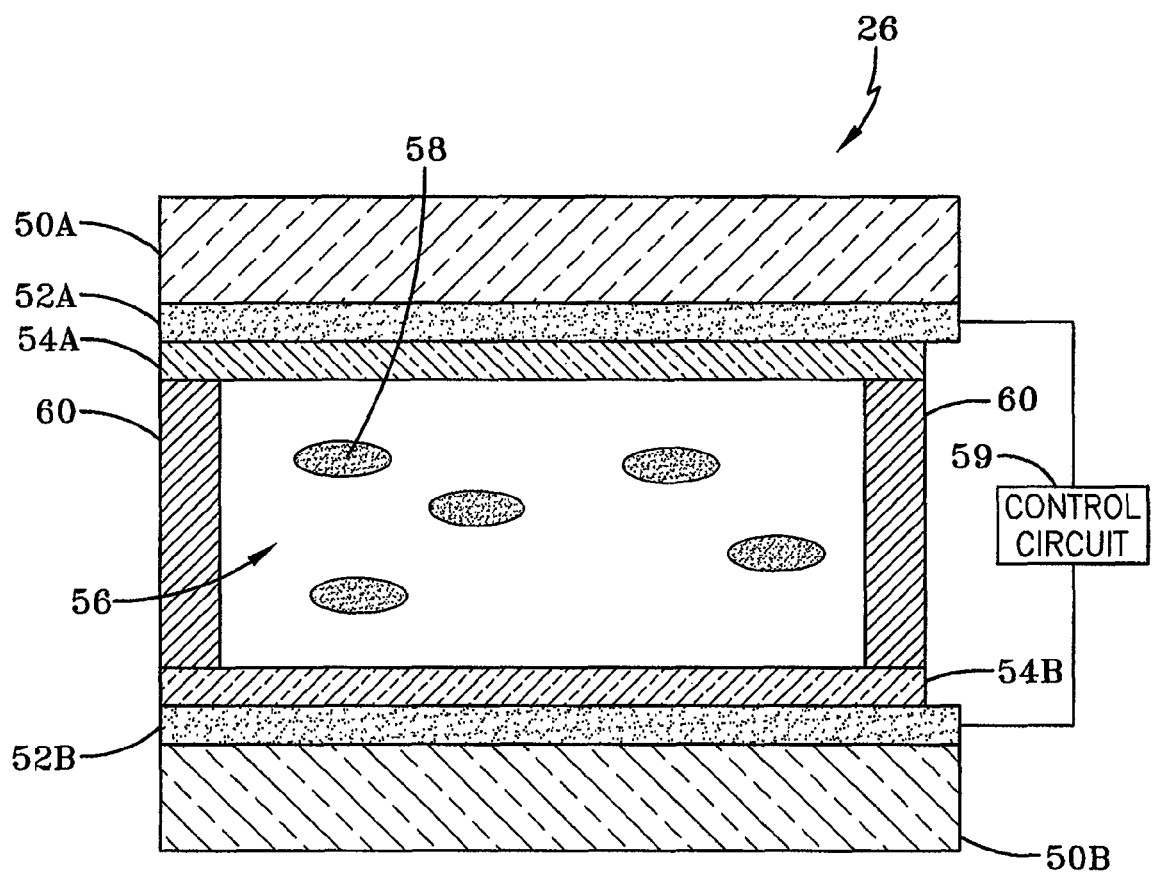
FIG. 2 is an elevational, cross-sectional schematic of an electro-optic device, such as a liquid crystal lens, used in eyewear according to the present invention.

Referring now to FIG. 2, it will be appreciated that one type of an electro-optic material used in an optical device may be a liquid crystal lens or cell construction. Although a liquid crystal cell construction is described below, it will be appreciated that any electro-optic material, such as electro-chromic dyes, electro-phoretic materials, or like materials could be used in place of the liquid crystal material. Such liquid crystal cell constructions are disclosed in U.S. Pat. Nos. 6,239,778; 6,690,495; 7,102,602; all of which are incorporated herein by reference. In addition, the liquid crystal cell, or any other electro-optically active material, can be used in any optical device as defined herein.

Briefly, a standard liquid crystal cell construction is designated generally by the numeral 26. Such a cell may comprise spaced apart, opposed substrates 50A and 50B, wherein each substrate provides corresponding transparent electrode layers 52A and 52B, which are typically formed from indium tin oxide or other appropriate conductive material. As will be discussed, electrode layers allow for application of a voltage across the gap between the substrates. The substrates may be flat, curved, or doubly curved. The substrates may also be rigid or flexible. If required, an alignment layer 54 may be disposed on each electrode layer or just one of the electrode layers. The alignment layers preferentially align the liquid crystal molecules adjacent to the alignment layers, wherein the molecules are part of the liquid crystal material received between the substrates. A gap is typically provided between the substrates and may be maintained by spacers, as is commonly known in the art. Accordingly, the opposed substrates 50 form a gap 56 which receives a liquid crystal or other electro-optically active material 58. Each electrode layer 52 is connected to a control circuit 59 which may include a switch, a power supply, a drive circuit and other circuit components. The control circuit applies a voltage and/or voltage waveform in an appropriate manner to change the orientation of the electro-optic material. As such, by changing the orientation of the material, various optical properties—absorption, no absorption, high transmission, low transmission, and the like—may be obtained.

An edge seal 60 is provided around or about the outer periphery of the cell 26 so as to retain the electro-optic material between the substrates. It will be appreciated that the edge seal and associated area is not an optically active area. Accordingly, it is desirable to keep the edge seal periphery area hidden or otherwise concealed within the frame of the eyewear.

Interconnection Tab

Referring now to FIGS. 3-11, it can be seen that an interconnection tab is designated generally by the numeral 500. It will be appreciated that the various components of the tab 500 shown in the drawings are somewhat enlarged so as to facilitate recognition of the tab's structural features. The tab 500 is utilized to connect electrodes of a liquid crystal or other electro-optically active cell to a control circuit or electrical energy power source to control operation of the cell. As will become apparent as the description proceeds, the tab 500 eliminates the need to provide patterned electrodes on the cell substrates or to provide a special configuration of the substrates. The tab 500 simplifies the connection of the cell to a control circuit or other power source by reducing time-consuming assembly steps. It is also believed that use of the tab 500 provides a more reliable connection between the cell and the control circuit.

Figure 3:
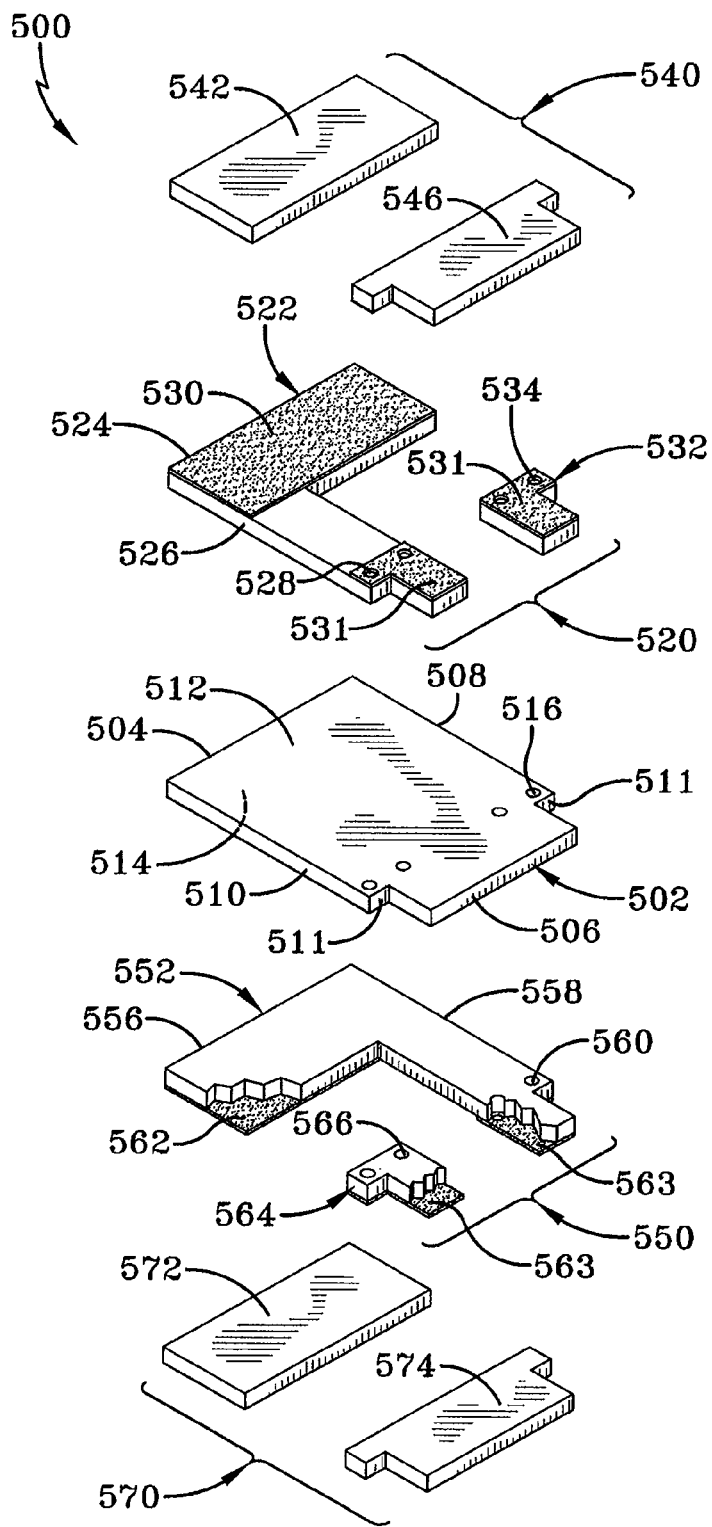
FIG. 3 is an exploded top perspective assembly view of an interconnection tab made in accordance with the concepts of the present invention, wherein some of the components are broken away.
Figure 4:
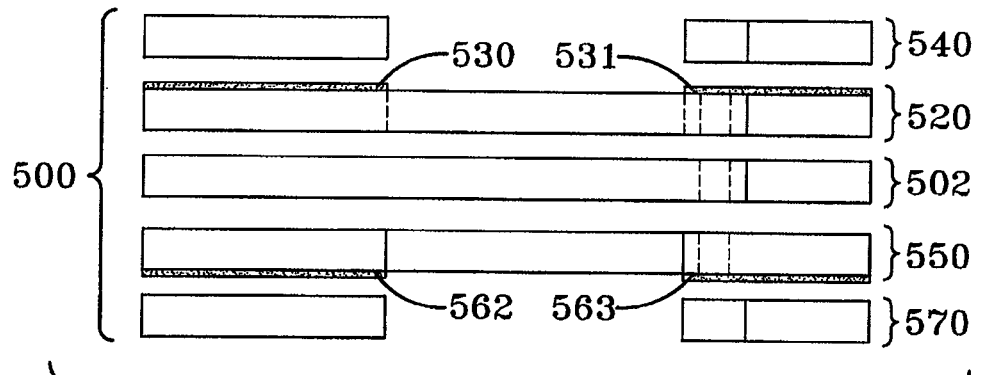
FIG. 4 is a side elevational assembly view of the interconnection tab shown in FIG. 3.

As best seen in FIGS. 3 and 4, the interconnection tab 500 is a multi-layer construction that when assembled facilitates connection to electrodes provided by the cell. The tab 500 includes an insulator 502 which is made of a flexible non-conductive plastic material. Although the thickness of the insulator layer is dependent upon the size of the lens it will be connected to, in the present embodiment the insulator layer has a thickness of about 25μ (i.e. the thickness of the interconnection tab is greater than the separation between the substrates in the cell). The insulator 502 is provided in a substantially square or rectangular configuration, although it will be appreciated that other shapes could be utilized. In any event, the insulator 502 provides a cell edge 504 which is positionable between the electrodes of the cell 26, and a terminal edge 506 at an opposite end of the insulator 502 which is connectable to a control circuit or other power source. Connecting the edges 504 and 506 to one another are side edges 508 and 510. The side edges 508, 510 may be provided with terminal notches 511 proximal to the terminal edge 506. The notches 511 are utilized to easily identify and orient the interconnect tab to the cell as will become apparent as the description proceeds. The insulator 502 provides a top surface 512 opposite a bottom surface 514. It will be appreciated that the terms top and bottom are used only as a reference in describing the insulator layer inasmuch as the tab could be re-oriented as long as the cell edge 504 is what is received between the substrates of the cell 26.

The insulator 502 has a plurality of holes 516 which extend therethrough. As will become apparent, the holes are associated with specific electrodes and at least two holes are required, wherein at least one of the holes is associated with a corresponding electrode. It will also be appreciated that the holes are positioned proximal to the terminal edge 506.

An electrode layer 520 is disposed on the surface 512 of the insulator 502. The electrode layer 520 includes a tab electrode 522 which is made of a conductive material such as copper or an alloy that is conducive for connection to a conductive electrode provided by the cell and is suitable for electrical connection to the drive circuit components. It will also be appreciated that the material used for all electrodes disposed on the insulator layer 502 can withstand flexure without separating therefrom. The tab electrode 522 is affixed, plated, or otherwise secured to the top surface 512. In the embodiment illustrated here, the tab electrode 522 is L-shaped and includes a first leg 524 which extends primarily along the cell edge 504 but does not extend past or over the insulator 502. As used herein for all electrodes of the interconnection tab, any portion of an electrode disposed along any edge of the insulator should be taken to mean that the electrode portion is positioned substantially adjacent the recited edge on the designated surface. The tab electrode 522 also includes a second leg 526 which is substantially perpendicular to the first leg 524 and extends along the side edge 510 and terminates proximal to the terminal edge 506. Like the first leg 524, the second leg 526 does not extend past or over the insulator 502. The second leg 526 has a pair of holes 528 extending therethrough, although only one is required. The holes 528 are aligned with the corresponding holes 516 upon the insulator 502. A conductive adhesive 530 is disposed on the first leg 524 along the length of the cell edge 504. A non-conductive adhesive 531 is disposed on the second leg 526 proximal to the terminal edge 506.

The electrode layer 520 also includes a pad electrode 532 which is spaced apart from and does not contact the tab electrode 522. The pad electrode 532 is affixed to the top surface 512 in much the same manner as the tab electrode 522 and positioned along a portion of the terminal edge 506 and the side edge 508 and is aligned with the terminal notch 511. The pad electrode 532 does not extend beyond the edge of the insulator 502 and is also provided with a non-conductive adhesive 531 on a side opposite the insulator. The pad electrode 532 provides a pair of holes 534, although only one is required, which are aligned with the corresponding holes 516 of the insulator.

A cover layer, designated generally by the numeral 540, is positioned over the electrode layer 520. The cover layer 540 includes a cell edge release liner 542 which covers the first leg 524 that is positioned along the cell edge 504. The cover layer 540 also includes a terminal edge release liner 546 which covers an end portion of the second leg 526 and the pad electrode 532 along the terminal edge 506. The cover layer 540 is utilized to prevent contaminants from attaching to the adhesive provided on the electrode layer 520 prior to assembly to the lens. At the appropriate time, the liners are removed so as to allow attachment to the electrodes 522 and 532.

An electrode layer 550 is positioned and secured to the surface 514 of the insulator 502. The electrode layer 550 is configured in much the same manner as the electrode layer 520. Specifically, the electrode layer 550 includes another tab electrode 552 which has a first leg 556 disposed along the length of the cell edge 504. The tab electrode 552 also provides a second leg 558 which extends substantially perpendicularly from the first leg 556 and is positioned along the side edge 508 and extends all the way to the terminal edge 506. The second leg 558 is also notched at the junction of the terminal edge 506 and the side edge 508. The second leg 558 has at least two holes 560, although only one is required, wherein the holes 560 are aligned with the holes 516 insulator and the holes 534 provided by the pad electrode 532. As with the other electrodes, the tab electrode 552 does not extend beyond the edges of the insulator 502. A conductive adhesive 562 is disposed along the first leg 556 on a side opposite the insulator 502. An optional conductive adhesive 563 is disposed on the pad electrode 564 and a portion of the leg 558 proximal to the terminal edge 506.

The electrode layer 550 also includes another pad electrode 564 which is spaced apart from the electrode 552 along the terminal edge 506 and a portion of the side edge 510. The pad electrode 564 has at least two holes 566, although only one is required, which are aligned with the corresponding holes 516 of the insulator 502 and the holes 528 of the electrode 522.

A cover layer 570 selectively covers the layer 550 in much the same manner as the cover layer 540 covers the electrode layer 520. Specifically, the cover layer 570 includes a cell edge release liner 572 which covers the first leg 556. If the conductive adhesive 563 is used, the release liner 574 covers the pad electrode 564 and a portion of the second leg 558 that is aligned along the terminal edge 506 and the side edge 508. If the conductive adhesive 563 is not used, release liner 574 is absent. The cover layer 570 is utilized to prevent contaminants from attaching to the adhesive provided on the electrode layer 550 prior to assembly to the cell and the driving or power supplying components. At the appropriate time the liners are removed so as to allow attachment to the electrodes 552 and 564.

Figure 6:
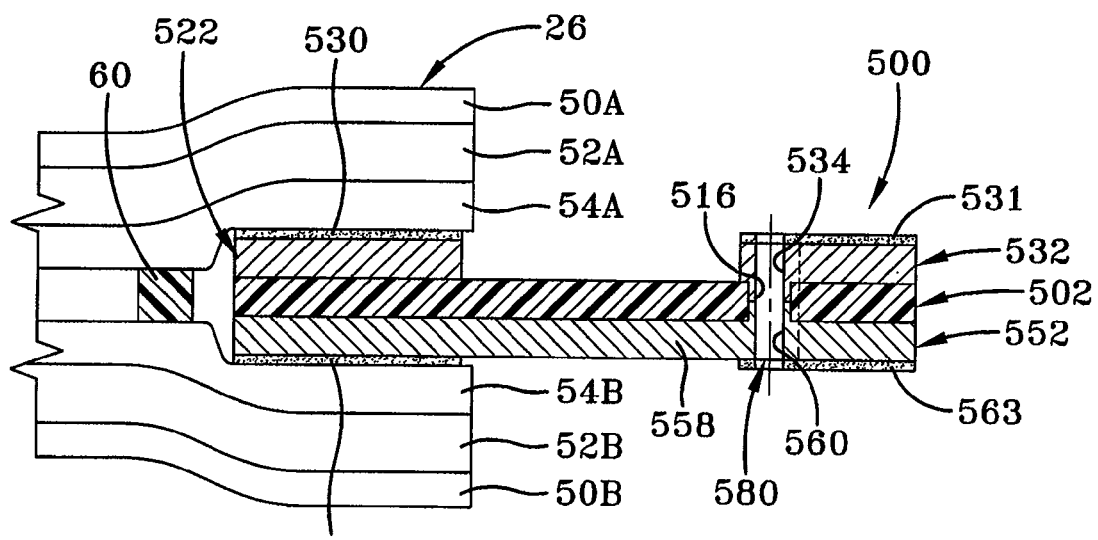
FIG. 6 is a partial cross-sectional view of the tab and the lens taken along lines 6-6 of FIG. 5.
Figure 7:
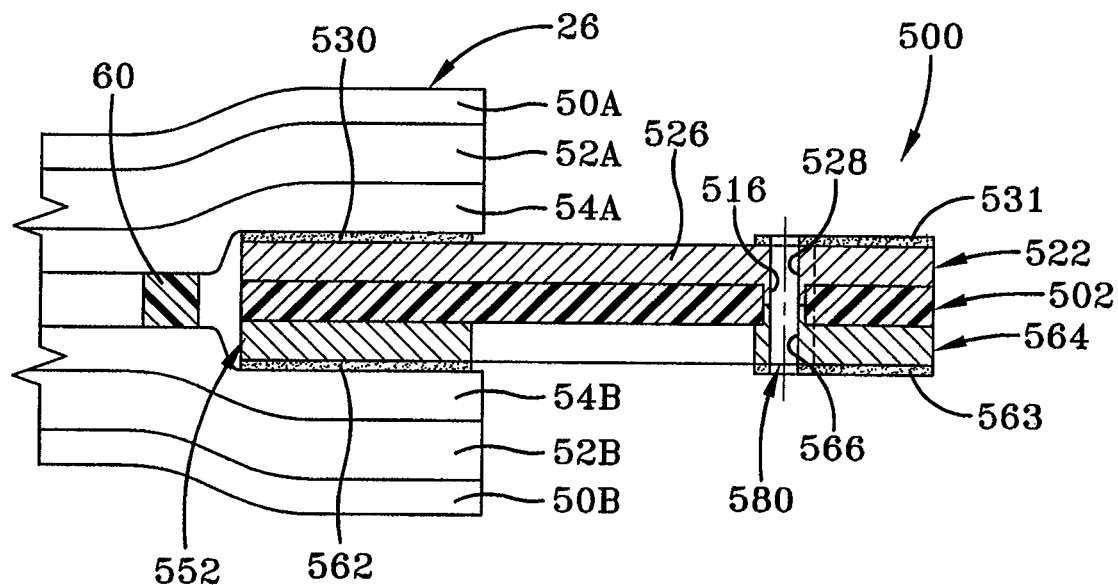
FIG. 7 is a partial cross-sectional view of the tab and the lens taken along lines 7-7 of FIG. 5.
Figure 8:
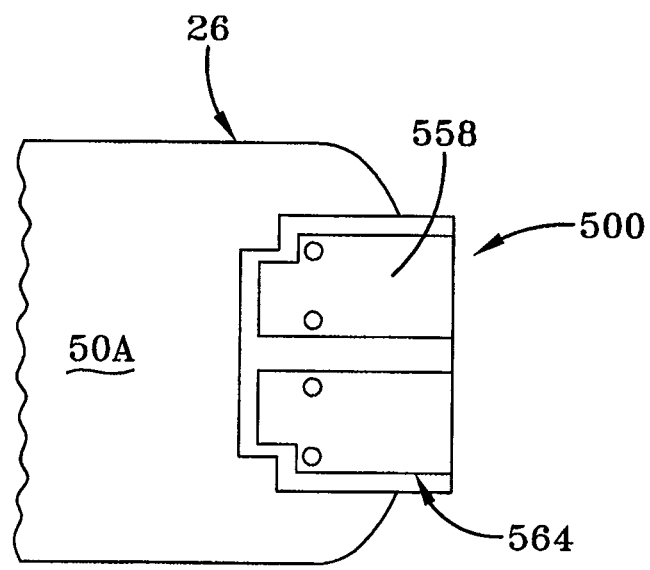
FIG. 8 is a partial top view of the lens connected to the interconnection tab, wherein the interconnection tab is folded over the lens.

As best seen in FIGS. 6 and 7, all of the holes that are aligned with one another are configured in such a manner so as to form a via 580 for electrical conductivity to occur between a pad electrode on one side of the insulator layer and the tab electrode on the other side of the insulator layer. In other words, the insulator 502 is constructed in such a manner that when the electrode layers are disposed thereon, the interior surface of the holes 516 are coated with the conductive material used for the electrodes such that an electrical connection is made between the pad electrode on one side of the insulator layer and the tab electrode on the other side of the insulator layer.

Figure 5:
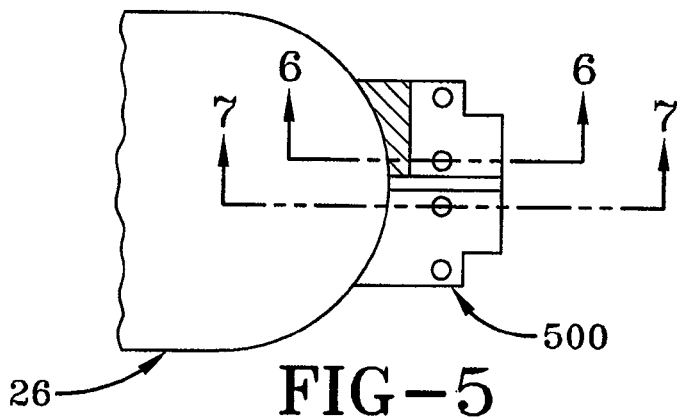
FIG. 5 is a partial top view of the interconnection tab connected to an electro-optic lens according to the present invention.

Referring now to FIG. 5, it can be seen that the interconnection tab 500 is secured to the cell 26. This interconnection is best seen in FIGS. 6 and 7. During assembly of the cell 26, an edge seal 60 surrounds the outer periphery of the opposed substrates so as to retain the liquid crystal or other optically active material within the spaced apart gap of the substrates 50A and 50B. As noted previously, the substrates 50 are provided with an electrode layer 52 which may or may not be covered by a polyimide layer 54 or other related material needed to facilitate the operation of the cell 26. After or during assembly of the substrates 50A and 50B to one another, the interconnection tab 500 is positioned therebetween. If the tab 500 is inserted after assembly of the cell 26, the substrates, which in this embodiment are flexible, are slightly separated at a selected area and the tab is inserted. Then the substrates are pressed or laminated back together, with or without heat, to re-attach the substrates to one another. And, it will be appreciated that the positioning of the tab may occur prior to, or after, the filling of the cell with liquid crystal or other material. In the alternative, if the substrates 50A and 50B are rigid, the substrates could be slightly notched so as to accommodate the thickness of the tab 500. Any openings between the inserted tab and the substrates are filled by the edge seal 60.

Immediately prior to the insertion of the tab 500, the liners 542 and 572 are removed so as to expose the conductive adhesive provided on the respective first leg portions 524 and 556. In some embodiments, in order to ensure a proper connection between the interconnection tab and the electrodes provided by the cell, the edges of the substrates 50A and 50B completely cover and can extend at least a small portion past the width of the first legs 524 and 556. Application of pressure to the substrates 50A and 50B creates an electrical connection between the respective electrodes 52A and 52B and the first legs 524 and 556. Use of appropriate conductive adhesive material ensures that the electrode layers make electrical contact with the facing electrode layers of the cell. The alignment layers 54A and 54B are constructed of such a material so as to not interfere with the electrical connection between the substrate's electrodes and the electrode layers of the interconnection tab.

Referring now to the details of FIGS. 5 and 6, which are not drawn to scale, it can be seen that the bottom electrode 52B is connected to the tab electrode 552 and also to the pad electrode 532 through the via 580. Accordingly, the electrical connection to the bottom substrate electrode is made by electrically and mechanically connecting an appropriate attachment to the pad electrode 532 and/or the second leg 558.

And as seen in FIG. 7, a similar type of connection is made to the top electrode substrate 52A by the tab electrode 522 and the pad electrode 564. Accordingly, an appropriate connection can be made to the top substrate by applying an electrical connection to the pad electrode 564 and/or the second leg 526.

Skilled artisans will appreciate that the tab electrodes 522 and 552 could be any shape, such as rectangular. In some embodiments, use of an L-shape for the tab electrodes 522 and 552 provides maximum contact with the adjacent substrate electrodes while providing an extending portion of sufficient size to allow interconnection to the control circuit while ensuring that the size of the tab does not interfere with expected mechanical operation of the optical device, such as for example an eyewear or mirror's frame and/or hinges. Any shape of the electrodes that meet these features can be incorporated into the tab 500.

Figure 9:
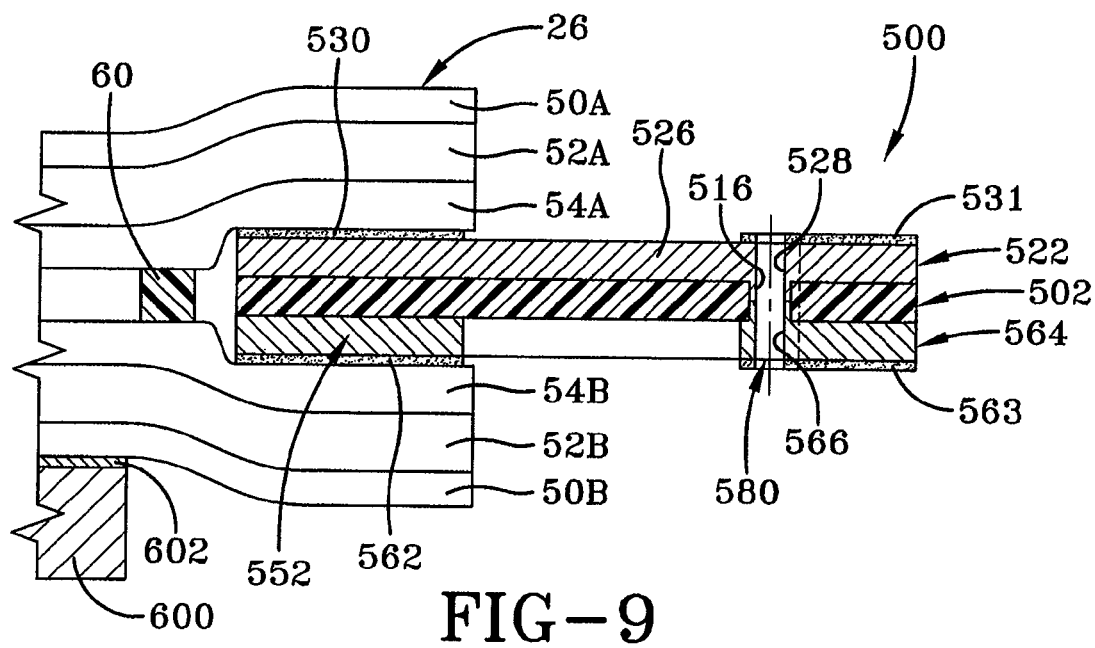
FIG. 9 is a partial cross-sectional view of the tab used in an electro-optically variable mirror.
Figure 10:
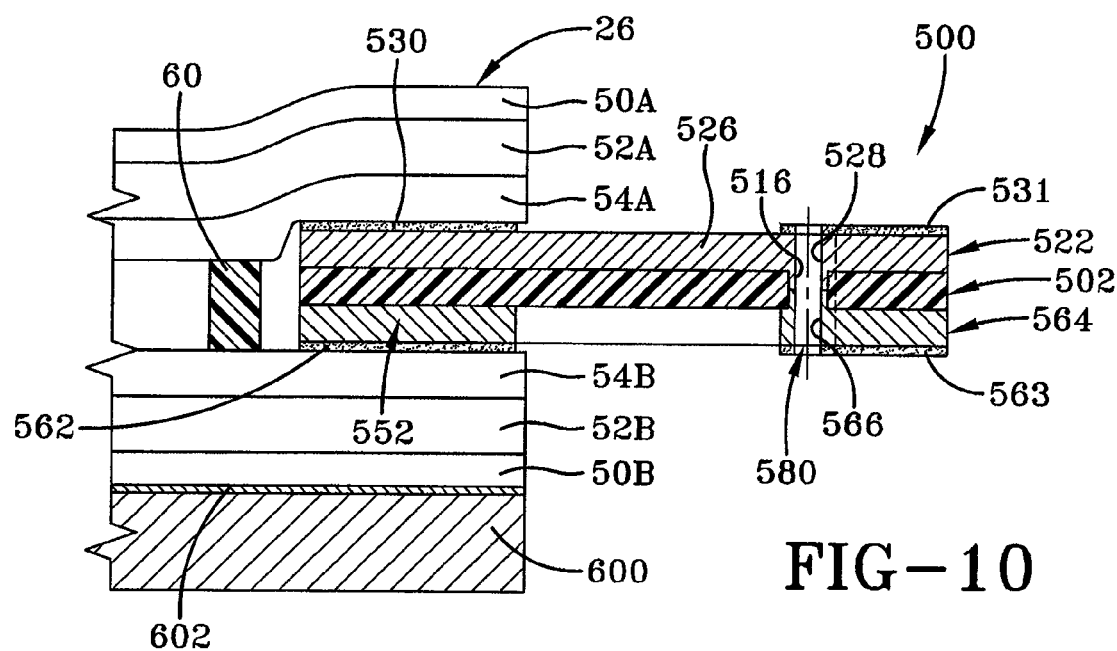
FIG. 10 is a partial cross-sectional view of the tab used in another configuration with an electro-optically variable mirror.
Figure 11:
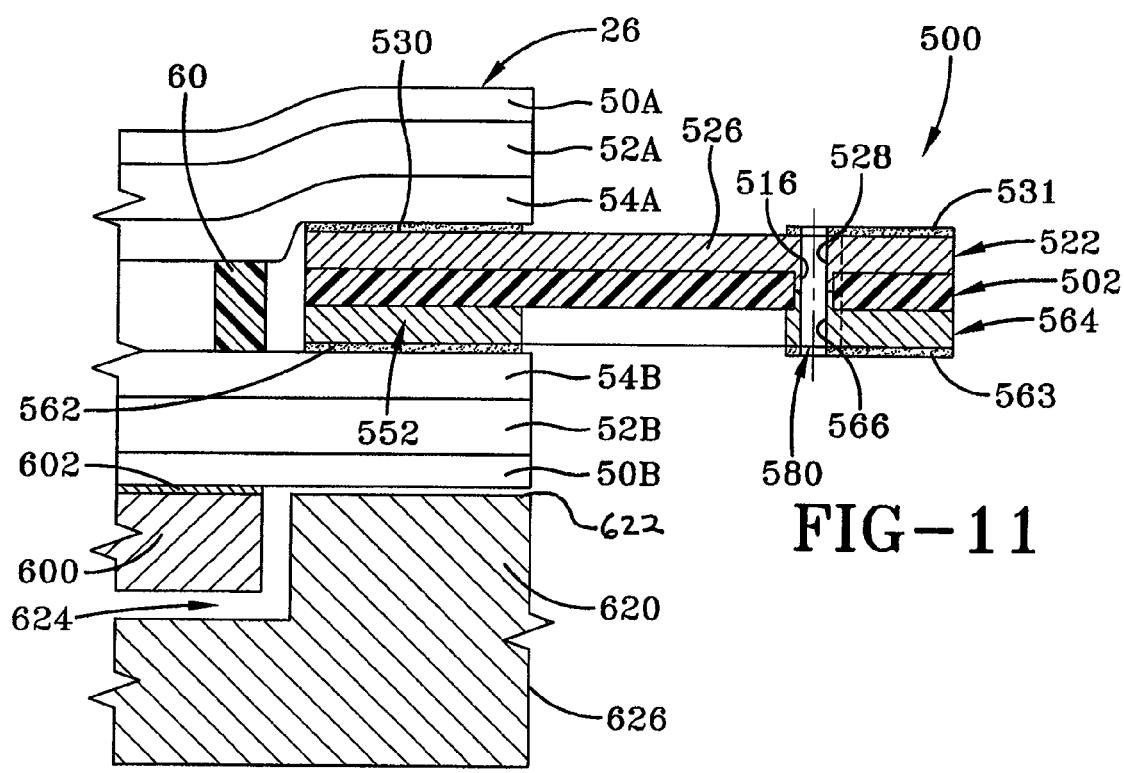
FIG. 11 is a partial cross-sectional view of the tab used in yet another configuration with an electro-optically variable mirror.

FIGS. 9-11 show additional configurations where the substrates 50A and 50B may be attached to a rigid backing layer 600, such as glass in an electro-optically variable mirror, scope, etc. In such examples, as shown in FIGS. 9-11, flexible substrates 50A and 50B may be used together with an interconnection tab 500 that is of a greater thickness than the cell gap (i.e. the gap between the two substrates 50, 52, or 54, depending on which layers are present). As shown in FIG. 9, an edge of the backing layer 600 is positioned so as to be slightly removed from an edge of the cell 26. An adhesive 602 may be used to secure the cell 26 to the backing layer 600. In FIG. 10, the edges of the backing layer 600 and the cell 26 are substantially flush with one another. An optional adhesive 602 may also be used to secure the layer 600 and the cell 26 to one another. FIG. 11 additionally shows an example of how a casing 620 can be used, for example a mirror casing. Specifically, an edge of the backing layer 600 is slightly removed from an edge of the cell 26. An adhesive 602 may be used to secure the layer 600 to the cell 26. The casing 620 is provided with a facing surface 622 that provides a recessed area 624 to receive the layer 600. The facing surface 622 supports the surface of the cell 26. The casing 620 has an edge 626 that may be flush with the cell's edge or extend beyond the cell edge.

Depending upon the use of the cell, for example: eyewear frames, goggle frames, mirror or scope casing, window frame or other carrying device, the interconnection tab can be folded over in an appropriate direction so as to allow for spring-biased contacts to make contact with the electrode facing surface. In one embodiment, shown in FIG. 8, the interconnection tab 500 is folded over an eyewear lens 26, and specifically the substrate 50a, so as to show a portion of the second leg 558 and the pad electrode 564, both of which may then be positioned to contact electrodes or wires for connection to a control circuit. The same folding over may be used for an electro-optically variable mirror using a liquid crystal cell, the interconnection tab being folded over the substrates or the glass backing of the mirror for connection to a control circuit.

Use of the interconnection tab is advantageous for many reasons. Use of the tab simplifies electrical connections to the cell and saves on manufacturing steps in assembly of the cell into the final product. For example, assembly of lenses into goggles, visors, sunglasses, and other eyewear; or assembly of a switchable mirror, window, etc. into its frame is facilitated. Special modification and/or patterning of the cell electrodes is not required, saving on process steps and costs in manufacturing the optical device. Since the tab makes electrical contact with both substrates, it eliminates the need for crossover dots and the process steps to form them. The tab is flexible so as to allow for adaptation to different connection mechanisms coupled to the control circuit. It is believed that use of the tab provides for a more reliable connection. And it will be appreciated that the tab is scalable so that it can be used for different sizes of an eyewear or other optical devices. Indeed, the interconnection tab can have a greater thickness than a liquid crystal cell, making the tab more robust. Still another advantage of the present invention is that if the electric connection is found to be defective, the tab can be easily removed and replaced to allow re-working of the cell.

Thus, it can be seen that the objects of the invention have been satisfied by the structure and its method for use presented above. While in accordance with the Patent Statutes, only the best mode and preferred embodiment has been presented and described in detail. It is to be understood that the invention is not limited thereto and thereby. Accordingly, for an appreciation of the true scope and breadth of the invention, reference should be made to the following claims.

What is claimed is:

1. An optical device having at least one interconnection tab, comprising:
   a pair of opposed substrates having a gap therebetween filled with an electro-optic material, each said substrate having a facing surface with a substrate electrode covered by an alignment layer disposed thereon;
   a sealing material disposed between said pair of opposed substrates to contain said electro-optic material; and
   at least one interconnection tab interposed between said substrates and used for connecting the substrate electrodes to a control circuit, said interconnection tab comprising:
   an insulator layer having opposed surfaces, each insulator surface comprising
   a tab electrode in electrical connection with the substrate electrode facing said tab electrode, and a pad electrode in electrical connection with the substrate electrode facing the opposed surface of the insulator layer
   wherein said electrical connection between said tab and pad electrodes and said substrates is made by contact with the alignment layer on each substrate.

2. The optical device according to claim 1, wherein said insulator layer, each said tab electrode, and each said pad electrode has at least one conductive via extending therethrough so that each said pad electrode is in electrical connection to the tab electrode on the opposed surface of the insulator layer.

3. The optical device according to claim 1, further comprising:
   a conductive adhesive disposed on at least a portion of each said tab electrode.

4. The optical device according to claim 1, wherein said insulator layer has a cell edge received between said pair of opposed substrates opposite a terminal edge extending from said substrates.

5. The optical device according to claim 1, wherein at least one said tab electrode is L-shaped.

6. The optical device according to claim 1, wherein each said pad electrode is spaced apart from said tab electrode on each said surface of the insulator layer.

7. The optical device according to claim 1, wherein said interconnection tab has a thickness that is greater than the gap between said pair of opposed substrates.

8. The optical device according to claim 1, wherein said interconnection tab is flexible.

9. The optical device according to claim 1, wherein said interconnection tab is removably insertable between said pair of opposed substrates.

10. The optical device of claim 1, wherein the device is an electro-optically variable mirror.

11. An optical device, comprising:
   a first and second flexible substrate having a gap therebetween filled with an electro-optic material and a sealing material disposed therebetween to contain said electro-optic material, said first substrate having a first substrate electrode and a first alignment layer and said second substrate having a second substrate electrode and a second alignment layer;
   an interconnection tab interposed between said first and second substrates, said interconnection tab comprising:

an insulator layer having a top surface opposite a bottom surface;

wherein disposed on said top surface is a first tab electrode and a first pad electrode; and wherein disposed on said bottom surface is a second tab electrode and a second pad electrode;

wherein the first tab electrode is in contact with the first alignment layer and in electrical connection with the first substrate electrode, and wherein the second tab electrode is in contact with the second alignment layer and in electrical connection with the second substrate electrode.

12. The optical device of claim 11, wherein the first tab electrode and the first pad electrode on the top surface are spaced apart from each other, and wherein the second tab electrode and the second pad electrode on the bottom surface are spaced apart from each other.

13. The optical device of claim 11, wherein said device is an electro-optically variable mirror.

14. The optical device of claim 11, wherein said insulator layer has at least two conductive vias extending therethrough so that the first tab electrode is in electrical connection with the second pad electrode, and the second tab electrode is in electrical connection with the first pad electrode.

15. The optical device of claim 11, wherein each of the first and second tab electrodes includes a portion that extends beyond said first and second flexible substrates for connection to a control circuit.

* * * * *